US010138739B2

(12) United States Patent
Podgorski et al.

(10) Patent No.: US 10,138,739 B2
(45) Date of Patent: Nov. 27, 2018

(54) PART CONSISTING OF A CERAMIC MATERIAL, COMPRISING A BASE AND A WALL

(71) Applicant: SAFRAN AIRCRAFT ENGINES, Paris (FR)

(72) Inventors: Michael Podgorski, Paris (FR); Ludovic Molliex, Brunoy (FR)

(73) Assignee: SAFRAN AIRCRAFT ENGINES, Paris (FR)

( * ) Notice: Subject to any disclaimer, the term of this patent is extended or adjusted under 35 U.S.C. 154(b) by 695 days.

(21) Appl. No.: 14/436,358

(22) PCT Filed: Oct. 16, 2013

(86) PCT No.: PCT/FR2013/052470
§ 371 (c)(1),
(2) Date: Apr. 16, 2015

(87) PCT Pub. No.: WO2014/060699
PCT Pub. Date: Apr. 24, 2014

(65) Prior Publication Data

US 2015/0285084 A1 Oct. 8, 2015

(30) Foreign Application Priority Data

Oct. 18, 2012 (FR) ..................................... 12 59964

(51) Int. Cl.
*F01D 5/28* (2006.01)
*B28B 1/00* (2006.01)
(Continued)

(52) U.S. Cl.
CPC .............. *F01D 5/284* (2013.01); *B28B 1/001* (2013.01); *B32B 18/00* (2013.01); *C04B 35/10* (2013.01);
(Continued)

(58) Field of Classification Search
CPC . F01D 5/147; F01D 5/18; F01D 5/183; F01D 5/284; F01D 9/02; F01D 25/284;
(Continued)

(56) References Cited

U.S. PATENT DOCUMENTS 5,634,189 A * 5/1997 Rossmann ............ B22F 3/1109 428/547
5,837,960 A * 11/1998 Lewis .................... B23K 26/34 219/121.63
2002/0090313 A1* 7/2002 Wang ..................... B22F 3/004 419/10

FOREIGN PATENT DOCUMENTS

FR 2 712 218 A1 5/1995

OTHER PUBLICATIONS

International Search Report dated Feb. 12, 2014 in PCT/FR13/052470 Filed Oct. 16, 2013.

* cited by examiner

*Primary Examiner* — Richard Edgar
*Assistant Examiner* — Alexander White
(74) *Attorney, Agent, or Firm* — Oblon, McClelland, Maier & Neustadt, L.L.P.

(57) ABSTRACT

A part made of a ceramic material, including a portion forming a base and a portion forming a wall, wherein the base consists of a low-porosity ceramic material and the wall is obtained by powder sintering and includes an envelope and a core, the core being within the envelope, the porosity of the core being higher than that of the base and increasing the further it is from the base.

12 Claims, 2 Drawing Sheets

(51) Int. Cl.

| | |
|---|---|
| ***F01D 9/02*** | (2006.01) |
| ***B32B 18/00*** | (2006.01) |
| ***C04B 35/10*** | (2006.01) |
| ***C04B 35/565*** | (2006.01) |
| ***C04B 35/584*** | (2006.01) |
| ***C04B 38/06*** | (2006.01) |
| *C04B 111/00* | (2006.01) |

(52) U.S. Cl.
CPC .......... *C04B 35/565* (2013.01); *C04B 35/584* (2013.01); *C04B 38/06* (2013.01); *F01D 9/02* (2013.01); *C04B 2111/00405* (2013.01); *C04B 2235/665* (2013.01); *C04B 2235/775* (2013.01); *C04B 2237/343* (2013.01); *C04B 2237/365* (2013.01); *C04B 2237/368* (2013.01); *C04B 2237/76* (2013.01)

(58) Field of Classification Search
CPC ........... F05D 2230/22; F05D 2300/612; B28B 1/001; B32B 18/00; C04B 35/10; C04B 35/565; C04B 35/584; C04B 38/06; C04B 2111/00405; C04B 2235/665; C04B 2235/775; C04B 2237/343; C04B 2237/365; C04B 2237/368; C04B 2237/76
See application file for complete search history.

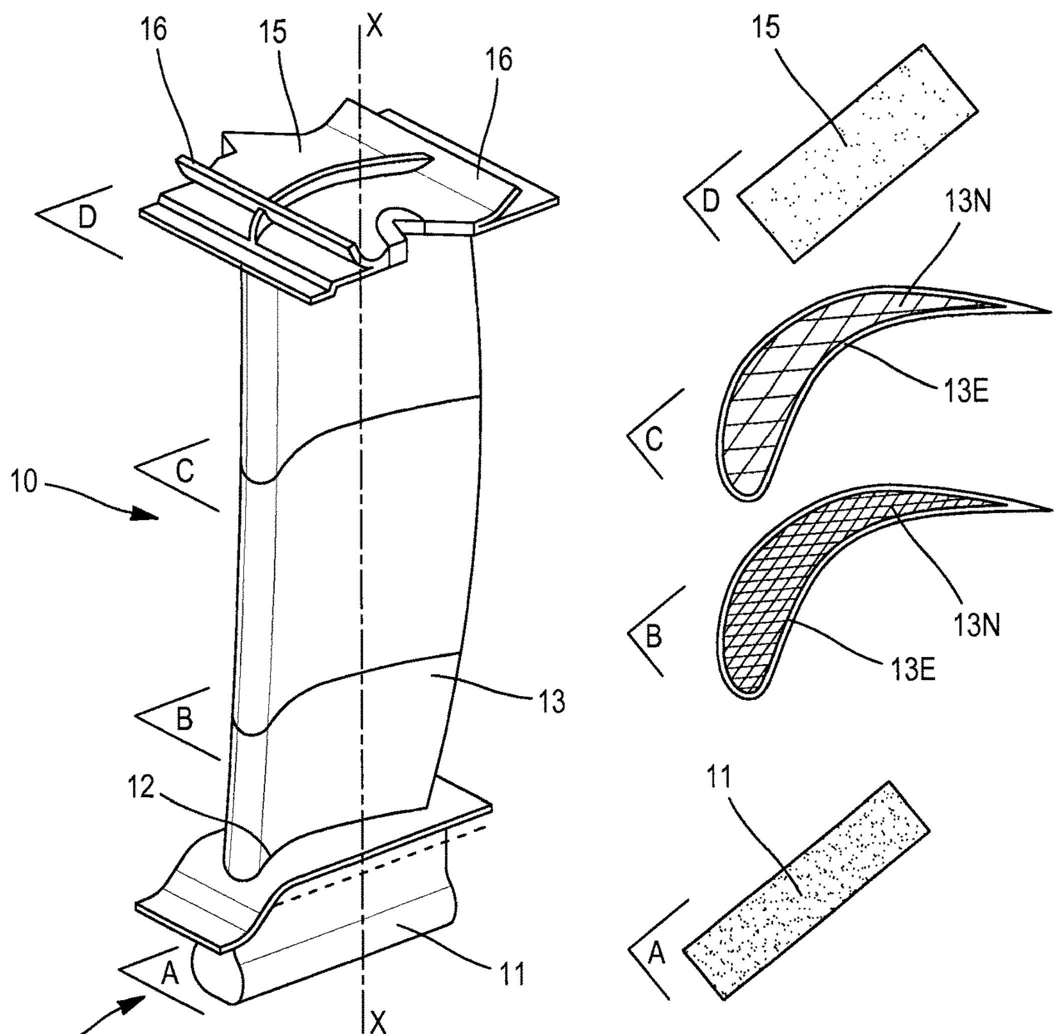
FIG. 1
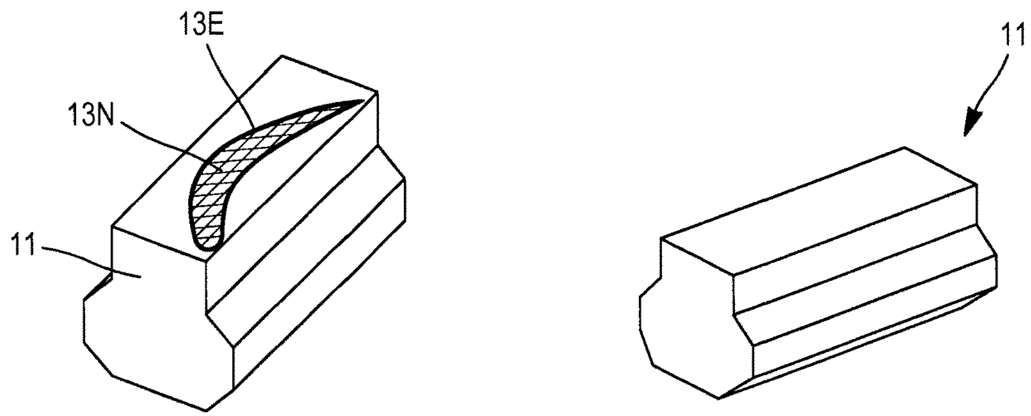
FIG. 4
FIG. 3

PART CONSISTING OF A CERAMIC MATERIAL, COMPRISING A BASE AND A WALL

TECHNICAL FIELD OF THE INVENTION

The field of the present invention is that of manufacturing parts made at least in part of ceramic material, and more particularly parts for a turbine engine, in particular a gas turbine engine, such as turbine rotor blades or fixed nozzle vanes.

PRIOR ART

In the hot parts of a turbine engine, through which high-temperature gases flow, metal alloys are used which are capable of withstanding these temperature levels and, if necessary, appropriate cooling by means of fluid allows these parts to operate at temperatures beyond the stability of the material.

In the context of developing new gas turbine engines in the aeronautical field, ever lighter materials having good structural properties at high temperatures are being sought. Ceramics are materials which can meet these requirements. They are used for parts positioned, downstream of the combustion chamber, from the turbine to the afterbody of the engine.

The manufacturing technique of powder sintering, which is a method for directly producing mechanical parts or other objects from powders which are more or less fine, is known. According to one manufacturing method, the powders are agglomerated using various processes to form a part in the unfinished state, which is then heated to a temperature which is sufficient for the grains to either melt or to bind together by diffusion along the contact regions thereof. A certain level of cohesion is thus obtained for the part. According to a particular technique, the part is constructed from successive layers. In this method, the material is in the form of a powder that is heated under the action of a laser beam or electron beam which is guided along a path corresponding to the surface of a portion of the part. Repeating the process of applying powder and sintering said powder using the laser or the electron beam makes it possible to progressively thicken the part and to obtain the desired shapes. The amount of heat applied by the laser beam or electron beam depends on the nature of the material. If necessary, polymers (which are either preceramic or not) which are sensitive to heat can be used to ensure binding during formation of the part, which polymers can then be eliminated by heat treatment in the case of non-preceramic polymers. The description of a tool for producing a part by laser heating is given in FIG. 2 and the implementation of this technique is detailed below.

Considering that, for the hot parts of the gas turbine engines, the limit temperature of the ceramics is greater than that of the alloys used in the prior art, the present applicant has set the object of producing parts, such as turbine rotor blades, from ceramic material in accordance with the technique of binding powders using a laser beam or electron beam.

A further object of the invention is a means for reducing the mechanical stress in the root region of rotating parts, such as turbine rotor blades, to the extent that the greatest mechanical stress is kept to the root region.

Since strain on parts made of monolithic ceramic material is initiated by defects, a further object of the invention is a means allowing the probability of encountering a defect of critical size to be reduced.

Since the temperatures which are likely to be encountered may exceed the limit temperatures for the use of the ceramics, a further object of the invention is to design cooled parts.

Since cooling is ensured by the circulation of a fluid in the part and, for this purpose, channels are intended to be produced within said part, a further object of the invention is a method for shaping ceramics which allows this type of channel to be produced during manufacture of the part.

More particularly, this method does not need to use extensive machining techniques.

SUMMARY OF THE INVENTION

These objects are achieved according to the invention by a part made of ceramic material, comprising a portion forming a base and a portion forming a wall, the part being characterised in that the base is made of ceramic material of low porosity and the wall is obtained by ceramic powder sintering, and in that it has an envelope or contour and a core, the core being positioned within the envelope and the porosity of the core being greater than that of the base, and increasing as the base gets further away.

Owing to its porosity or density gradient, the structure of the part according to the invention makes it possible to have a portion which is considerably lighter, thus ensuring a reduced level of stress on the base in the case of movable parts. Moreover, it has the advantage of reducing the possibility of encountering a defect of critical size which is likely to weaken said structure owing to the reduction in the volume of the ceramic within the parts.

Furthermore, the porous nature or the presence of cavities makes it possible to provide circulation of cooling fluid which does not require machining, contrary to the prior art.

Preferably, the base is also produced by ceramic powder sintering.

According to other features, on one hand the porosity of the material forming the base is less than 3%, and on the other hand the porosity of the core is greater than 5%, preferably between 10 and 50%.

The term "porosity" relates to the proportion of empty space in the part for the portion in question. This empty space is linked to the structure of the material, and it relates to the space made between the grains of ceramic material which are bound in the structure. The density of the material is in an inverse relationship to its porosity.

In the present application, for the portion forming the wall, in another embodiment, the relationship between the volume of the cavities made by narrow partitions formed by bound ceramic grains and the volume of the partitions is also expressed in terms of porosity.

Moreover, if cooling is provided, the base also comprises channels for conveying the cooling air to the wall. In this case, the channels are not covered by the definition of the porosity of the base.

In the present application, the invention has two aspects:

- controlling the porosity of the ceramic and therefore the density;
- creating cavities within the wall of the part, leading to a reduction in the volume of the material.

Therefore, according to a first embodiment, the core comprises a porous material made of ceramic grains which are bound by partial sintering and form spaces therebetween.

"Partial sintering" is understood to mean a technique of sintering at a temperature which is lower than that which would lead to a maximum density.

According to another embodiment, the core comprises cavities separated by partitions, the partitions being produced by sintering by means of a laser beam or electron beam. The partitions are dense; the porosity thereof is less than 3%.

Advantageously, the core has portions having different cavities, in particular portions in which the size of the cavities increases as the base gets further away.

According to a particular embodiment, the part comprises a heel in the extension of the wall, of which the porosity is lower than that of the material forming the core.

The invention relates in particular to a turbine engine blade of which the base forms the root of the blade, the wall forms the blade airfoil, optionally having a heel of which the porosity is less than that of the core.

The invention also relates to a method for manufacturing such a part, having a step of forming the wall by using a sintering tray containing powder with which the base is flush at the start of the step, and comprising selective sintering of the powder in successive layers by means of a laser beam or electron beam, the successive layers being obtained by making the part move progressively downwards in the sintering tray.

The method in particular includes producing the base separately by powder sintering and then forming the wall by depositing successive layers of ceramic powder and binding them by sintering the layer.

BRIEF DESCRIPTION OF THE FIGURES

The invention will be better understood and other aims, details, features and advantages thereof will emerge more clearly in the following detailed explanatory description of an embodiment of the invention given by way of purely illustrative and non-limiting example, with reference to the accompanying schematic drawings, in which:

FIG. 1 shows a turbine rotor blade made of ceramic material having a structure according to the invention;

FIG. 3 shows an example of a single base of a part according to the invention;

FIG. 4 shows the first layer formed by laser sintering on the base from FIG. 3;

DETAILED DESCRIPTION OF EMBODIMENTS OF THE INVENTION

Figure 2:
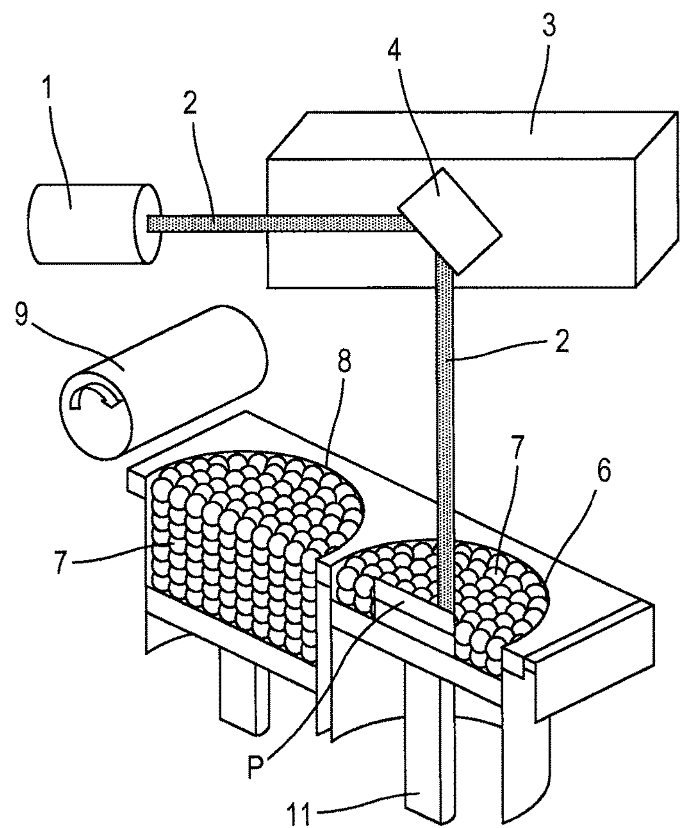
FIG. 2 shows a laser-fusion sintering machine.

With reference to FIG. 1, a turbine blade 10 can be seen which forms a part which can be produced according to the invention. The blade comprises a root, the base 11, by means of which it is mounted on the rim of a turbine disc. The root has a platform 12 mounted thereon and is extended, along its axis XX in the direction of the centrifugal forces to which it is subjected during operation of the engine, by a wall 13 forming the blade airfoil which is swept by the hot engine gases. In this case, the blade has a heel 15 mounted thereon which is provided with sealing strips 16. The heel 15 and the platform are outer and inner surface elements, respectively, of the duct of the gas engines between which the blade airfoil radially extends. The sealing strips form a seal with a ring provided on the stator of the turbine stage.

According to the invention, this part which is made of ceramic material has a density which varies along its axis XX. The variation in density is schematically shown by the sections along the planes which are transverse relative to the axis XX: A, B, C and D of the part along the axis XX.

The base 11 is of maximum density. This is, for example, an element obtained by shaping a ceramic powder in a mould, said powder optionally being combined with a binder. This step is followed by sintering heat treatment of the unfinished blank produced by the mould. According to the composition of the material used, the treatment may include intermediate debinding steps. The porosity of this element is preferably less than 3%.

The wall 13 has an envelope 13E and a core 13N. The envelope forms the outer surface of the wall. It is thin, for example less than 1 mm, preferably approximately 0.5 mm, and of low porosity like the base. The envelope delimits the core 13N, of which the porosity is greater. This porosity is greater than 5%, preferably between 10 and 50%. Correspondingly, its density is lower, providing the above-mentioned advantages of reducing the centrifugal mechanical stress on the base, when the part, as in this example, is mounted on a rotor. Advantageously, the density is not the same along the entirety of the axis. As can be seen in sections B and C, said density is represented schematically by different grid patterns having a smaller or larger mesh size. The heel, shown by the section D, may have a lower density than that of the base and a greater density than that of the wall. It is produced by sintering grains of ceramic powder.

Such a part is produced in part by powder sintering, of which the method set out below is recalled in relation with the device from FIG. 2, which shows a machine for producing a part by powder sintering by means of a laser beam or electron beam.

A laser-beam or electron-beam generator 1 emits a beam 2 of appropriate power, which it directs towards an arrangement of reflecting mirrors 3, of which the last mirror 4 can pivot so as to ensure that the surface of the part to be produced, for example the blade 10 mentioned above, is swept.

The portion of the part P which has already been formed is immersed in a tray 6 such that it can be covered with a layer of the powder 7 which is suitable for sintering at regular intervals. A second tray 8, for supplying powder, is positioned to the side of the sintering tray 6 and is filled with this sintering powder 7. A device forming a piston 9 makes it possible to move a given quantity of powder 7 from the supply tray 8 to the sintering tray 6, in order to cover the portion of the part P with a layer of powder of a given thickness. The thickness of this layer corresponds to that of which can be increased that of the portion of the part during a sintering pass between the grains by the beam 2. Devices for lowering the sintering tray 6 and raising the supply tray 8 make it possible, on one hand, to keep the portion of the part to be sintered P flush with the sides of the tray 6 and, on the other hand, to bring a layer of powder 7 having the correct thickness to be opposite the piston 9 of the supply tray 8.

The sintering and binding of the grain to form the part 10 is carried out in a succession of basic operations which take place in the following manner: since the portion of the part P is flush with the sides of the sintering tray 6, the piston 9 is moved towards this tray 6 so that it deposits the desired thickness of powder 7 on the portion of the part P, and is then returned to a stand-by position at the end of the supply tray 8. The laser beam or electron beam 2 sweeps the surface of the portion of the part P using the oscillating mirror 4, thereby causing partial melting—or an increase in temperature such that the diffusion between the grains is activated—of the surface layers of the layer and causing said layer to aggregate to the part P, and the thickness is increased. The portion of the part P formed is then moved downwards to compensate the increase in its thickness and so that its surface is once more flush with the sintering tray 6, whereas the supply tray 8 is raised to provide an adequate quantity of powder 7 opposite the piston 9. This process is repeated the number of times that are required to arrive at the desired geometry and dimensions for the complete part 10.

According to the invention, the base 11 of the part to be produced is firstly arranged in the sintering tray 6. This base 11 which is shown in FIG. 3 is preferably obtained separately using a conventional ceramic powder sintering method, that is to say by forming an unfinished part in a mould, which part is formed by ceramic powders and a binder, followed by sintering heat treatment together with an intermediate debinding step. In the case of a turbine rotor blade, the base 11 preferably comprises the root of the blade and optionally the platform. Conventional methods allow a part to be produced by sintering which is very dense and which has a porosity of less than 3%. According to a feature of the method of the invention, the base 11 comprises a planar-surface portion on its upper face, optionally in the region of the platform, if this is provided.

The base is arranged in the sintering tray together with the ceramic powder such that the planar-surface portion is flush with the surface of the powder. The method then includes producing the wall 13 on this base 11 (FIG. 4) by means of the laser beam or electron beam in accordance with the steps set out above. The path of the beam is controlled by a control member which holds the geometric features of the wall in its memory. To produce a layer, the beam is controlled not only in terms of position but also in terms of energy input.

The surface of the envelope 13E is thus produced for the layer being constructed at a given porosity, in particular a porosity of less than 3%, similar to that of the base. Below this surface, the core 13N is constructed such that its porosity is greater than that of the surface. A lower density is obtained by keeping the energy of the beam at a lower level in order to obtain partial sintering. The porosity is greater than that of the base. It is at least 5%, preferably between 10 and 50%. Constructing the part layer by layer moreover allows layers to be produced which have a core of which the porosity varies along the axis XX. This porosity advantageously increases between the base and the heel.

According to a variant of the core of the wall, the movement of the laser beam is controlled so as to produce partitions which form cavities therebetween in the manner of a honeycomb structure. The partitions are made of a dense material, like the surface forming the envelope. The size of the cavities may advantageously change, preferably increase, between the base and the heel of the blade.

The ceramic material used may be of any kind. Preferably, ceramics are selected which can be used at temperatures of greater than 1000° C.; these are, for example, carbides such as SiC, oxides such as $Al_2O_3$ or nitrides such as $Si_3N_4$. Eutectic ceramics are also suitable.

The granulometry of the powders is selected in order for it to be possible for sintering to be carried out by means of a laser or an electron beam. It is observed that the lower the size of the powder, the easier it is to produce partial sintering at a low temperature.

The laser beam or electron beam is adapted to the material which is treated. For example, in the case of alumina $Al_2O_3$, a YAG laser emitting at 9400 $cm^{-1}$, having a power of between 10 and 30 W and together with optimal movement at a speed of 96 mm/s is suitable for this application.

The ceramics may be part of a mixture having a hot-melt precursor which forms a binder and which is optionally eliminated subsequently by appropriate heat treatment.

Final machining is optionally provided if it is necessary for the roughness to be reduced.

The method used to manufacture these parts results in significant residual stress which is due to the thermal gradients generated by the successive melting of the layers. These gradients may increase as a function of the geometry, the thickness and changes in section of the parts to be produced. Depending on the materials, the residual stress arising from these gradients may result in deformations of the part during construction, and in fissuring or cracking during use. It is therefore important to control the temperature during the sintering process and to maintain a uniform temperature in the powder in order to minimise the residual stress during solidification. An appropriate heating means, for example a resistive heating means, is used for this purpose.

Figure 5:
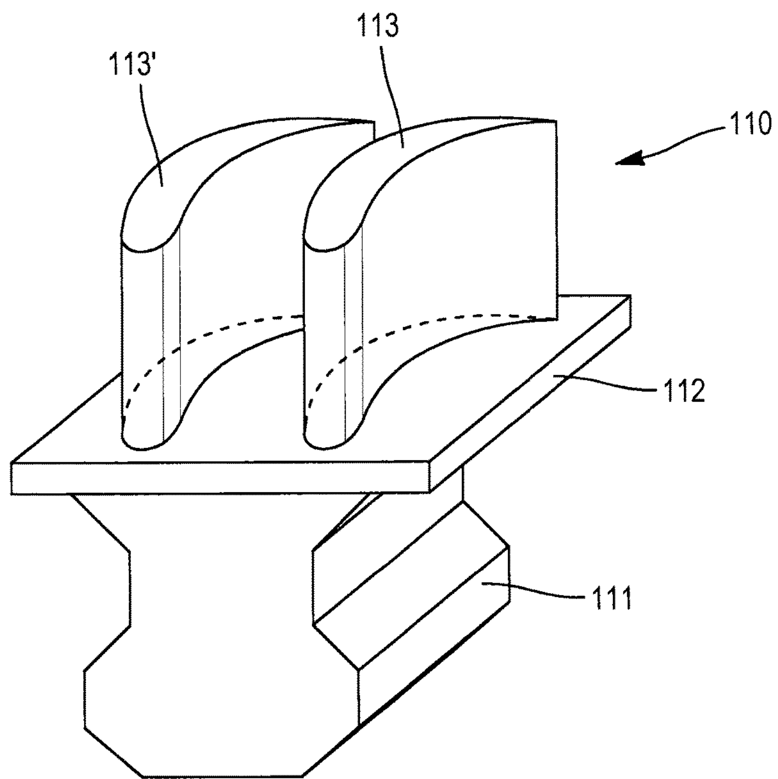
FIG. 5 shows a variant of a double turbine blade on the same base.

According to a variant of the invention, the part is a pair of turbine blades as shown in FIG. 5. The solution provided by the invention therefore makes it possible to produce, by direct manufacturing, two walls on the same base. The base 111 comprises a root for mounting on a turbine disc and a platform 112. Two walls 113, 113', which correspond to two adjacent walls in a turbine rotor, are supported on this platform. These two walls are constructed in the same manner as described above.

The invention claimed is:

1. A turbine blade made of ceramic material, comprising:

a root; and an airfoil, wherein the root is made of ceramic material and the airfoil is obtained by ceramic powder sintering, and wherein the airfoil includes an envelope and a core, the core being positioned within the envelope and a porosity of the core being greater than a porosity of the root, the porosity of the core increasing along the airfoil along an axis in a direction of centrifugal forces which the turbine blade is subjected to during operation.

2. The turbine blade according to claim 1, wherein the root is produced by ceramic powder sintering.

3. The turbine blade according to claim 1, the porosity of the material forming the root being less than 3%.

4. The turbine blade according to claim 1, wherein the porosity of the core is greater than 5%.

5. The turbine blade according to claim 4, wherein the porosity of the core is between 10 and 50%.

6. The turbine blade according to claim 1, wherein the core comprises a porous material made of ceramic grains which are bound by partial sintering.

7. The turbine blade according to claim 1, wherein the core comprises cavities separated by partitions, a material forming the partitions having a porosity of less than 3%.

8. The turbine blade according to claim 1, wherein the core has portions having different cavities, sizes of the cavities increasing along the airfoil along the axis.

9. The turbine blade according to claim 1, further comprising a heel at a free end of the airfoil, a porosity of the heel being lower than the porosity of the core.

10. The turbine blade according to claim 9, wherein the heel includes sealing strips.

11. A method for manufacturing a turbine blade according to claim 1, comprising:

forming the airfoil using a sintering tray containing powder with which the root is flush at a beginning of the forming; and selective sintering of the powder in successive layers by a laser beam or electron beam, the successive layers being obtained by making the turbine blade move progressively downwards in the sintering tray.

12. The method according to claim 11, including producing the root separately by powder sintering and then forming the airfoil by depositing successive layers of ceramic powder and binding the root and the airfoil by sintering.

* * * * *